United States Patent [19]
Zamoyski

[11] Patent Number: 5,778,258
[45] Date of Patent: Jul. 7, 1998

[54] PHOTOGRAPHY BOOTH FOR DIGITAL IMAGE CAPTURE

[76] Inventor: Mark Zamoyski, 988 Foothill Dr., San Jose, Calif. 95123

[21] Appl. No.: 831,506

[22] Filed: Mar. 31, 1997

[51] Int. Cl.$^6$ ............................................. G03B 15/00
[52] U.S. Cl. ............................... 396/2; 396/4; 396/5
[58] Field of Search .................... 362/3, 8, 18; 396/2, 396/1, 3, 5; 4/599, 600, 612

[56] References Cited

U.S. PATENT DOCUMENTS

| | | | |
|---|---|---|---|
| 501,340 | 7/1893 | Hackh | 396/1 |
| 2,140,602 | 12/1938 | Simjian | 396/1 |
| 2,832,275 | 4/1958 | Applegate | 396/2 |
| 3,590,398 | 7/1971 | Jetter | 4/599 |
| 3,681,788 | 8/1972 | Le Blanc et al. | 4/599 |
| 5,383,099 | 1/1995 | Peters | 362/18 |

*Primary Examiner*—David M. Gray

[57] ABSTRACT

A photography booth including a plurality of vertical and horizontal frame elements attached to one another to form a generally cylindrical frame structure capable of detachably mounting a resilient sheet of material so as to form the resilient sheet of material into a cylindrical wall segment, capable of rotationally mounting a circular floor member within the cylindrical wall segment, having a camera mounting and positioning device, and having means for positioning a plurality of adjustable light sources.

3 Claims, 3 Drawing Sheets

PHOTOGRAPHY BOOTH FOR DIGITAL IMAGE CAPTURE

BACKGROUND

1. Field of Invention

This invention relates generally to photographic lighting accessories and methods and particularly to a photographic booth arrangement and devices to provide improved quality and throughput for digital image capture.

2. Description of Prior Art

Photography is an old and well known art in which many advances in cameras and accessories have been made. The advances in photography booths and methods available today relate primarily to taking portraits and/or using film and paper based photography. The current products do not meet the needs of photography intended for instant or eventual digitized image creation and editing.

Digital image capture results in a digitized image of the photograph which can subsequently be displayed and edited on a computer. This can be accomplished in on of several ways including using standard film based photography and then digitizing the resulting developed film or photograph, using a digital camera, or using an analog camera in conjunction with a digitizing board or circuitry in a computer. The needs of this type of digital photography or image capture differ in certain significant ways from conventional photography.

First, the background of the picture is almost as important as the object being photographed. The picture taken should be devoid of any background so that the object appears to "float" in either an empty or monochromatic background. No shadows, corners, reflections, or other background items should be visible. The background should also be chromatically different from the object photographed. Objects photographed in this manner can be more quickly and accurately identified by digital image editing software tools. This translates not only into time savings but improved image quality as edges of the object are not adversely effected or partially eliminated by the software tools.

Second, the ability of digital image capture setups to give instant feedback on the actual image to be captured changes the requirements of a photographic booth. The computer monitor can display an actual picture of what will be captured as the digital photograph. This "what you see is what you get" aspect of digital photography allows one to instantly see the effect of changes in lighting intensity, position or direction as well as changes in camera settings and positioning and object positioning. This in turn creates the need to be able to quickly and easily change these variables so that the best desired image can be determined and then digitally photographed (captured).

Third, the emerging commercial environment for digital images is different than that of mainstream photography today. Digital images tends to focus more on objects than people. The volumes of digital objects to be captured are much larger as companies move to creating digital visual archives for inventory and parts identification systems, digital sales tools, on line catalogs, manufacturing assembly instructions etc... This creates the need for photographic booths, methods, and processes that can quickly capture the high volume of images required, in a format favorable for digital editing, and at the place where the parts are located.

Prior to this invention, there has been an unfilled need for a device specifically suited to facilitate high quality, high volume, digital image capture. This invention provides a way of quickly creating a shadowless and backgroundless, or any other type of environment desired. Adjustable lighting, camera positioning, and product positioning devices fill the need for a quick, high quality, digital photo capture system. The booth can also be easily transported.

OBJECTS AND ADVANTAGES

It is an object of the invention to provide a photography booth specifically suited to facilitate high volume, high quality, digital photography or analog or standard photography that will subsequently be digitized. It is the object of this invention to provide shadowless and backgroundless, monochromatic, or any other type of desired environment with adjustable lighting and camera positioning for quick, high quality, digital photo capture that results in images much better suited for subsequent digital editing and processing.

Another object of the invention is to provide a photography booth where backgrounds may be quickly changed by the replacement of insertable members.

Another object of the invention is to provide an improved photography booth in which lighting intensity, position, and direction may be varied and its effect on the resulting digital image seen so that the desired resulting image can be determined, optimized and photographed.

Another object of the invention is to provide an improved photography booth which includes a device for quickly positioning and stabilizing a camera.

Another object of the invention is to provide an improved photography booth with a means of quickly positioning or rotating the object to be photographed.

Another object of the invention is to provide a commercially acceptable product that will greatly enhance the quality and throughput of photography subsequently digitized.

SUMMARY OF INVENTION

In accordance with the present invention a photography booth comprises a relatively cylindrical structural frame capable of receiving and forming a sheet of resilient material into a cylindrical segment and a means for rotatably mounting a circular, planar member within or near the base of the cylindrical segment. The circular, planar member forms the floor of the photography booth as well as being the means for forming the base of the sheet of resilient material into a cylindrical segment. The upper part of resilient sheet of material is formed into a cylindrical segment by fastening it to the structural frame with clamps, fasteners or any other suitable means. The photography booth may also have means for positioning a camera, means for providing adjustable lighting, and means for applying rotational force to the floor.

The booth thus described allows for ambient or artificial light to be introduced from beneath the floor as well as from the side and above the booth. Objects to be photographed may be placed on the floor and rotated as desired by rotating the floor. The walls and floor of the booth may be quickly changed to accommodate different background needs. Lighting and camera settings may be quickly changed and the results viewed through a computer monitor so that the user can see the exact image that will be captured.

STATIC DESCRIPTION OF INVENTION

Figure 1:
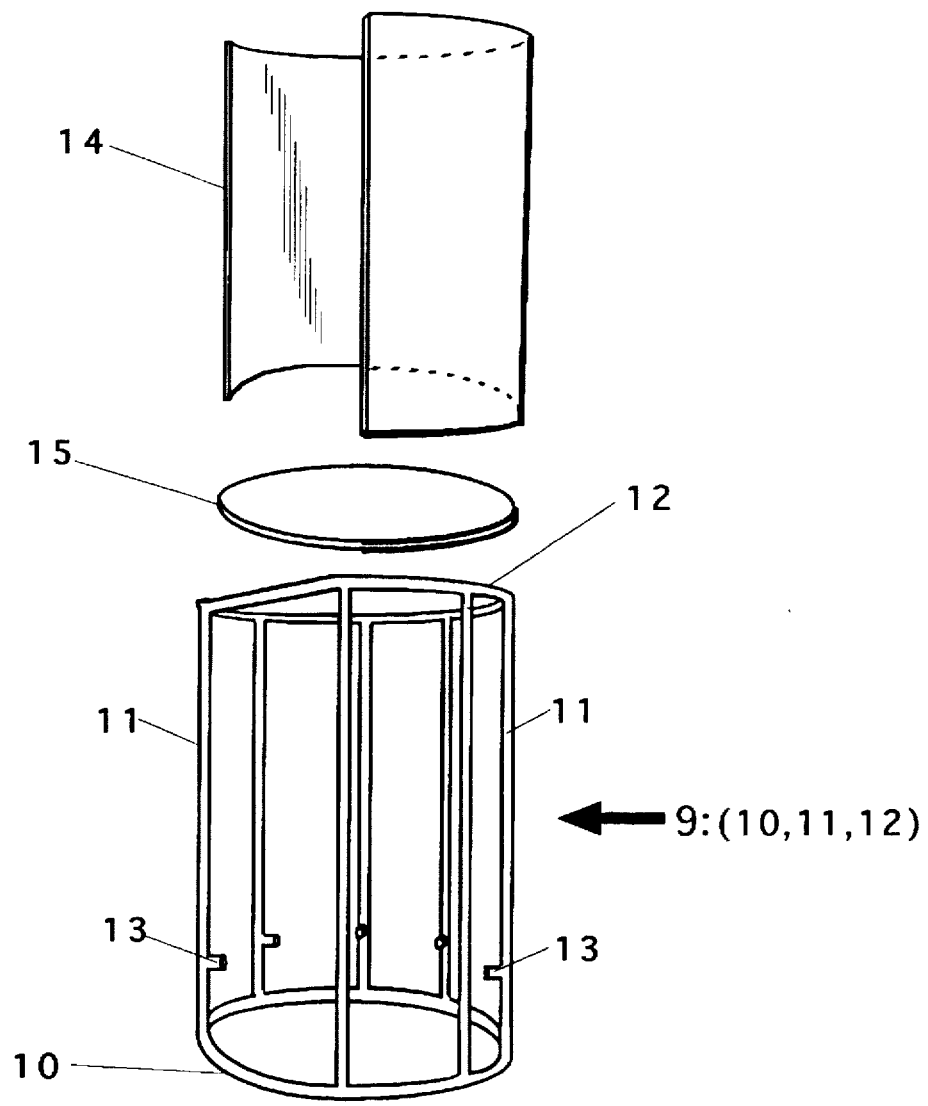
FIG. 1 is a perspective view illustrating the main members of a photography booth constructed in accordance with the present invention.

In accordance with the preferred embodiment of the present invention FIG. 1 shows a structural frame 9 into which a sheet of resilient or formed material 14 may be inserted and into which a circular, planar, floor member 15 may be inserted. The structural frame 9 consists of a substantially circular or polygonal base member 10 to which a plurality of vertical frame members 11 are perpendicularly attached and extend upwards. The vertical frame members 11 are attached at the opposite end to a substantially circular or polygonal top member 12. A plurality of perpendicular protrusions 13 from the vertical frame members 11 provide a simple means of rotatably mounting the circular planar floor member 15. The perpendicular protrusions 13 may also include bushings, wheels, ball bearings, caster wheels or any other suitable means for facilitating rotation of the circular, planar, floor member 15.

In the preferred embodiment, all of the members of the structural frame 9 are made from PVC pipe segments and various types of PVC pipe connectors or junctions and are joined with PVC adhesives or conventional fasteners. However, the members of the structural frame 9 can be made from single piece cast or molded plastic or any other suitable materials and joined with any suitable means or the entire structural frame 9 can be made from a single cast or molded piece of plastic or other suitable materials or composites. Also, in the preferred embodiment of the structural frame 9 additional structural elements may be added such as a plurality of substantially circular, polygonal, or horizontal members may be employed at various locations along the vertical frame members. In the preferred embodiment the circular, planar floor member 15 is made from a translucent plastic such as High Density Polyethylene (HDPE). However, it is also possible to use a transparent material such as acrylic, glass, or any other suitable material to act as a lower layer and an upper layer or layers constructed from HDPE or any suitable material or materials. The circular planar floor member 15 may be of any suitable color or with any suitable design, background, or scenery visible on its surface. In the current embodiment the sheet of resilient or formed material 14 is made of high impact styrene however any suitable material may be used in any suitable color or with any suitable design, background, or scenery visible on its surface.

Figure 2A:
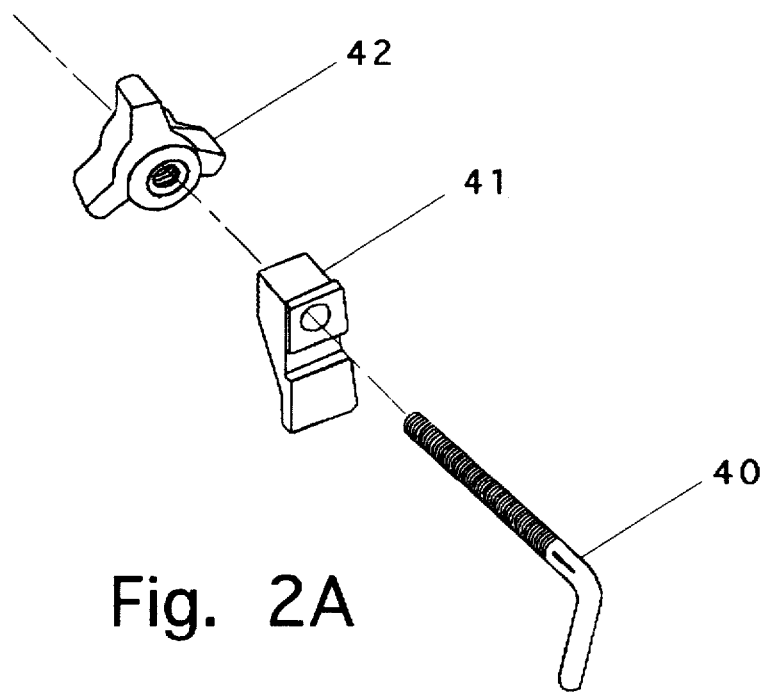
FIGS. 2A and 2B illustrate a means of attaching a resilient sheet of material to the structural frame so that the upper part of the resilient sheet of material is formed into a cylindrical segment and held in place so as to retain that shape.
Figure 2B:
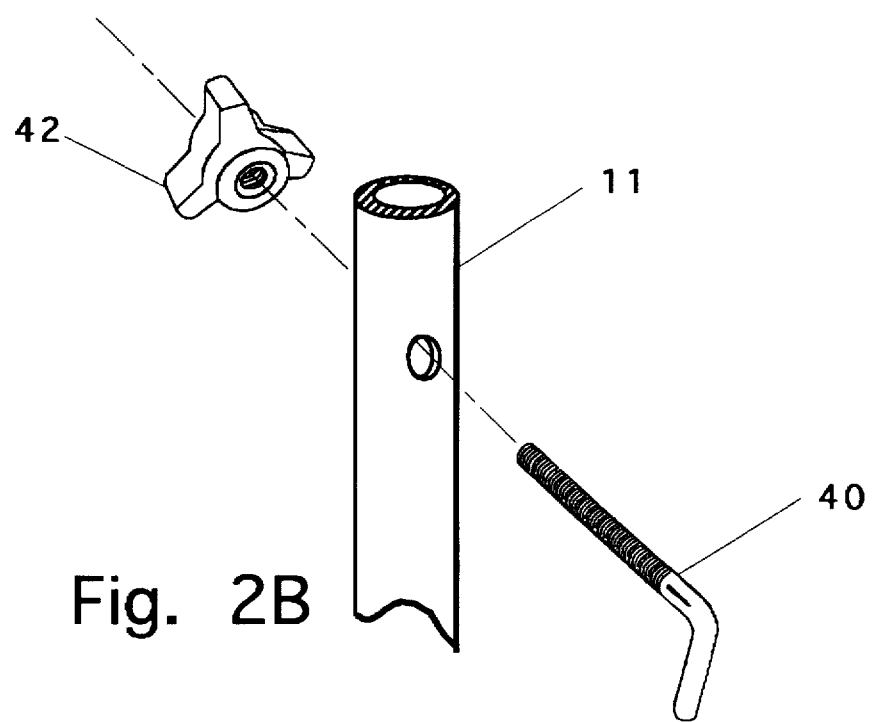

FIG. 2A and 2B show means for detachably holding the sheet of resilient or formed material 14 from FIG. 1 in place by clamping it to a member of the structural frame 9 from FIG. 1. FIG. 2 A shows a clamp that is made up of a right angled fastener 40 that is threaded on one end, a lower jaw member 41 that is slidably mounted on the threaded end of the right angled fastener 40 and three prong knob nut 42 that screws onto the threaded end of the right angled fastener 40. FIG. 2B shows a clamp that is made up of a right angled fastener 40 that is threaded one end and a three prong knob nut 42. The right angled fastener 40 is passed through holes drilled at the appropriate places in the vertical frame elements 11 or holes in the substantially circular or polygonal top member 12 (not shown) so that the resilient or formed material 14 is clamped as the three prong knob nut is tightened. Although FIG. 2A and FIG. 2B represent the preferred means any other suitable means such as hand clamps, clips, C-clamps, wood clamps or any other suitable clamping means as well as any conventional fasteners or fastening means may be used. Any other suitable means may also be used such as a tensionable, adjustable, or resilient ring or circular element with the approximate inside diameter of the structural frame 9 inserted inside of the sheet of resilient or formed material so as to press it tightly against the structural frame 9.

Figure 3:
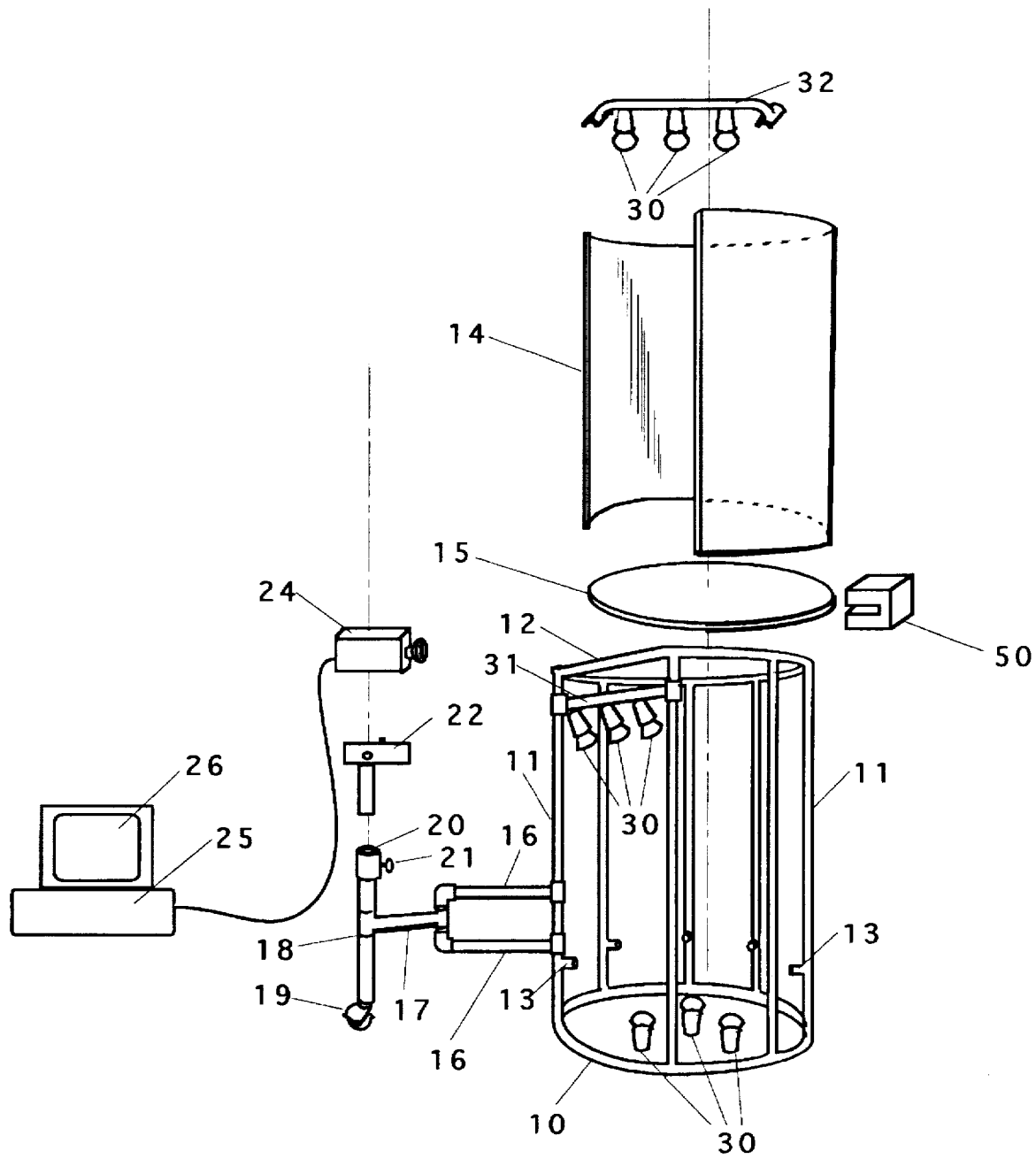
FIG. 3 is a perspective view illustrating the photography booth with a means for positioning and stabilizing a camera and variable and adjustable light sources positioned above, below, and through the side of the photography booth.

FIG. 3 shows the preferred embodiment of the present invention including a means for positioning and stabilizing a camera and means for positioning a plurality of adjustable light sources. The camera positioning arm is made up of two horizontal segments 16 pivotably attached to a vertical frame member 11 at one end and pivotably attached to a second horizontal member 17 at the other end. The second horizontal member 17 is attached at its other end to a vertical member 18 which extends both up and down. A caster wheel 19 is attached to the lower part of vertical member 18. The upper part of vertical member 18 has an open orifice 20 at the top and a threaded hole with a thumb screw 21 in the side. A typical camera mounting device 22 can be inserted into the open orifice 20 and a camera 24 can be attached to the other end of the mounting device 22. The camera in turn is connected to a computer 25 capable of converting, displaying on a monitor 26, and storing, the image viewed by the camera. Although FIG. 3 shows the preferred embodiment of the positioning arm, a positioning arm may be constructed in a multitude of ways including any single or multiple segment combinations, with or without stabilization features, or by any other suitable combination or geometrical arrangements of materials. In the preferred embodiment, all of the members of the positioning arm are made from PVC pipe segments and various types of PVC pipe connectors or junctions and are joined with PVC adhesives or conventional fasteners however any other suitable materials may be used. The caster wheel 19 is a commercially available product and any type of conventional furniture wheel, wheel mechanism with wheel, flat platform or foot, or any other suitable means may be used. In the preferred embodiment a conventional camera mounting and positioning mechanism from a tripod is used as the camera mounting device 22 however the camera mounting device 22 can range anywhere from a simple platform pivotably attached to a pipe segment to an elaborate camera positioning assembly available on a multitude of commercially available tripods or any other suitable means. Although the preferred embodiment uses a conventional Hi8 video camera, the camera 24 can be any video, single picture, analog or digital camera that is suitable for the purpose. Although in the preferred embodiment the computer 25 and monitor 26 is an Apple Computer Power PC system with digital video editing hardware and software from Truevision Inc. and Adobe Inc. any conventional or custom computer system, digital video system, software, or other suitable means may be used.

FIG. 3 also shows means of adjustable lighting. A side horizontal member 31 slidably and adjustably attached between two vertical frame members 11 to which commercially available, positionally adjustable light fixtures with lights 30 can be pivotably attached is the preferred embodiment for providing lighting from the open side of the booth. The preferred embodiment for providing lighting from above is a top horizontal member 32 to which commercially available adjustable light fixtures with lights 30 can be pivotably attached. Top horizontal member 32 can be removably attached to the structural frame 9. Lighting from underneath the booth is provided by placing or attaching commercially available, positionally adjustable light fixtures with lights 30 on the surface on which the photographic booth resides. Any or all of the lighting may be electrically controlled by conventional adjustable power output devices. In the preferred embodiment, all of the members of the adjustable lighting means are made from PVC pipe segments and various types and cut pieces of PVC pipe connectors or junctions and are joined with PVC adhesives or conventional fasteners however any other suitable materials may be used. In the preferred embodiment, the commercially available, positionally adjustable light fixtures with lights 30 that are pivotably attached to the side horizontal member 31 and top horizontal member 32 are flood light lampholders, the lighting fixtures underneath the booth are flood light lampholders connected to a lampholder cover which in turn is connected to a rectangular electrical box and the lamps used in all of the fixtures are conventional soft white track lighting bulbs however any suitable lights, fixtures, or portable lighting may be used in any suitable location around the booth. Furthermore, a conventional adjustable power output device that is commercially available to operate conventional lamps can be conveniently mounted one or more of the vertical frame members 11.

A means for rotating or positioning 50 the floor member 15 can be mounted to the structural frame 9. The rotational means may be a conventional motor, motor with gear reduction, stepper motor, variable speed motor or any other type of power source capable on producing motion and a means for converting that motion into rotational motion of the floor.

OPERATIONAL DESCRIPTION OF INVENTION

The various elements of the invention interact as follow to provide a quick way of capturing a large volume of high quality images suitable for digital editing. The photography booth in FIG. 3 would be set up at the inventory location on a rolling table or cart. The photographer would select and insert a sheet of resilient or formed material 14 and a circular, planar, floor member 15 into the structural frame 9. The floor member would form a sheet of resilient material into a cylindrical segment at its base and the top part would be formed by pressing the sheet of resilient material against the structural frame 9 and clamping it to said structural frame by means such as those shown in FIG. 2. If the sheet of material is already formed or preformed it would only need to be inserted and clamping would be optional. Additional circular floor members could be added to protect the surface of the floor or to obtain desired light diffusion. After connecting and turning on all electrical and electronic equipment the photographer is ready to go into production mode.

The photographer would begin by placing an object to be photographed on the floor member 15 and positioning the camera 24 so that the object was visible on the computer monitor 26. Adjustments could then be made, in any order, to the position or intensity of the lighting, to the camera settings such as focus, exposure, white balance etc..., to computer software settings pertaining to the digitization and display of the signal such as hue, saturation, brightness, contrast etc.., to the physical position and view of the object itself by rotating the floor member 15 or moving the part itself, or to the position of the camera such as height, angle and proximity to the part being photographed. The results of any adjustments described above could be viewed in real time through the computer monitor 26 and any further adjustments made. Once the photographer is satisfied that the image displayed on the monitor is what they want, the image can be captured and saved on the computer or peripheral through commands entered through the computer keyboard or mouse. This process is repeated for all objects to be photographed.

CONCLUSIONS, RAMIFICATIONS, AND SCOPE OF INVENTION

The photography booth of the invention anticipates the emerging as well as future needs of digital image capture or digital photography. While my above descriptions contain many specifications, these should not be construed as limitations on the scope of the invention, but rather as an exemplification of one preferred embodiment. Many other variations and uses are possible. Examples include:

providing rotation of the floor would be suitable for making digital video clips.

capturing images at discrete increments of the floor rotation would be very useful for certain documentation requirements.

providing floor and/or wall members with certain types of background designs or scenery could be very useful for certain special effects applications.

Accordingly, the scope of the invention should be determined not by the embodiment(s) illustrated, but by the appended claims and their legal equivalents.

I claim:

1. A photography booth comprising:
   a) a plurality of vertical frame members, each having a first end attached to an approximately circular or polygonal base member and a second end;
   b) a second approximately circular or polygonal member attached to each said second end to define a structural frame;
   c) said vertical frame members or said second approximately circular or polygonal member having means for mounting a resilient sheet of material so as to form said resilient sheet of material into a cylindrical segment;
   d) said vertical frame members having means for rotatably mounting a circular, planar member above said approximately circular or polygonal base member;
   e) a camera positioning arm pivotably attached to said structural frame wherein said arm comprising:
      1) a first arm member or members, each having a first end pivotably attached to said structural frame and a second end;
      2) a second arm member having a first end pivotably attached to said second end of each said first arm member or members and said second arm member having a second end;
      3) a camera mounting means adjustably attached to said second end of said second arm member.

2. The photography booth defined in claim 1 having means of applying rotational force to said circular, planar member.

3. The photography booth defined in claim 1 wherein said structural frame has means for positioning a plurality of adjustable light sources.

\* \* \* \* \*